(12) United States Patent
Leung et al.

(10) Patent No.: US 8,667,272 B2
(45) Date of Patent: Mar. 4, 2014

(54) SYSTEM AND METHOD FOR CONTENT DISTRIBUTION WITH BROADCAST ENCRYPTION

(75) Inventors: Wing Pan Leung, Hong Kong (HK); Xiaokang Xiong, Hong Kong (HK); Yiu Wing Wat, Hong Kong (HK); Zhibin Lei, Hong Kong (HK)

(73) Assignee: Hong Kong Applied Science and Technology Research, Hong Kong Science Park Shatin, New Territories, Hong Kong (CN)

( * ) Notice: Subject to any disclaimer, the term of this patent is extended or adjusted under 35 U.S.C. 154(b) by 163 days.

(21) Appl. No.: 13/294,153

(22) Filed: Nov. 10, 2011

(65) Prior Publication Data

US 2012/0121085 A1     May 17, 2012

Related U.S. Application Data

(63) Continuation-in-part of application No. 12/397,635, filed on Mar. 4, 2009, now Pat. No. 8,468,341.

(51) Int. Cl.
*H04L 9/00* (2006.01)

(52) U.S. Cl.
USPC .............................. 713/163; 713/168; 705/51

(58) Field of Classification Search
USPC ......................................... 713/163; 380/210
See application file for complete search history.

(56) References Cited

U.S. PATENT DOCUMENTS

| | | | |
|---|---|---|---|
| 5,878,135 A | | 3/1999 | Blatter et al. |
| 6,336,119 B1 * | | 1/2002 | Banavar et al. ................ 1/1 |
| 6,839,436 B1 | | 1/2005 | Garay et al. |
| 2005/0034150 A1 * | | 2/2005 | Muraoka .......................... 725/31 |
| 2006/0177066 A1 * | | 8/2006 | Han et al. ....................... 380/277 |
| 2008/0010242 A1 | | 1/2008 | Jin et al. |
| 2008/0046730 A1 | | 2/2008 | Han et al. |
| 2008/0085005 A1 | | 4/2008 | Jung et al. |
| 2008/0110982 A1 * | | 5/2008 | Song et al. .................... 235/381 |
| 2010/0228972 A1 | | 9/2010 | Wat et al. |

OTHER PUBLICATIONS

Boneh et al., Collusion Resistant Broadcast Encryption With Short Ciphertexts and Private Keys, Advances in Cryptology, 2005.

* cited by examiner

*Primary Examiner* — Techane Gergiso
*Assistant Examiner* — Ayoub Alata
(74) *Attorney, Agent, or Firm* — Ella Cheong Hong Kong; Sam T. Yip

(57) ABSTRACT

A content distribution method with broadcast encryption, comprising an encryption process that includes the computation of a ciphertext using a differential ciphertext generation method. The ciphertext needs to be recomputed whenever the subscriber set changes. The differential ciphertext generation method computes the new ciphertext by reusing previously preserved computational results of a previous ciphertext, thereby improving the efficiency of the system. A content distribution method with broadcast encryption also comprises a decryption process that includes the reconstruction of the encryption secret that is used for decrypting the encrypted content. A wide window point addition method is used in the encryption secret reconstruction. The wide window point addition method reuses previously preserved computational results of group-divided point additions of public parameters, thereby improving the efficiency of the system. A clustering solution with multiple instances of key server and entitlement server allows the expansion of user population in the content distribution network.

7 Claims, 1 Drawing Sheet

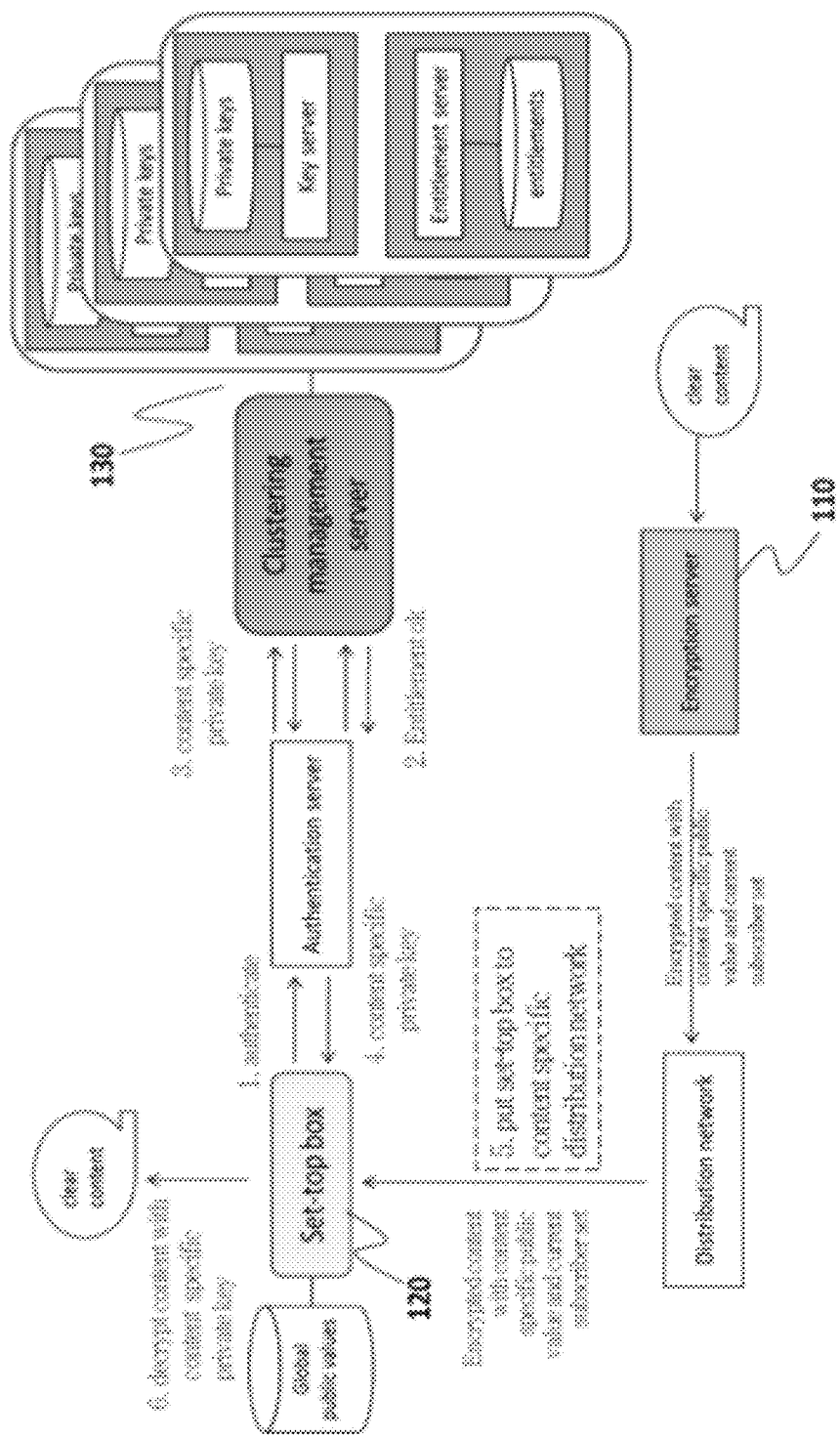

SYSTEM AND METHOD FOR CONTENT DISTRIBUTION WITH BROADCAST ENCRYPTION

CLAIM FOR DOMESTIC PRIORITY

This application is a continuation-in-part of U.S. patent application Ser. No. 12/397,635, filed Mar. 4, 2009, the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to networks, in particular, a computer network or a broadcast network such as television. Specifically, the presently claimed invention relates to encryption schemes used for encrypting privileged content distributed in a network.

BACKGROUND

In a broadcast encryption scheme, a content distributor encrypts its privileged content for users or clients who are listening on a broadcast channel or a distribution network. Any user or client can use his private key to decrypt the encrypted content received, but only the chosen subset of users or clients can decrypt the encrypted content into the original content. The content distributor can control and select for this subset. Broadcast encryption has several applications including access control in encrypted file systems, television subscription services, and media content protection.

Traditional broadcast encryption schemes, such as those using Public Key Infrastructure (PKI) or bilinear pairings, create cryptographic headers that in part based on the subscriber set, which is the subset of content receiving clients that can decrypt the encrypted content and hence view original content. One of these traditional broadcast encryption schemes is the Boneh-Gentry-Waters broadcast encryption scheme. The Boneh-Gentry-Waters broadcast encryption scheme is described in the report: Dan Boneh, Craig Gentry, and Brent Waters, *Collusion Resistant Broadcast Encryption With Short Ciphertexts and Private Keys*, Crypto, 2005; the disclosure of which is incorporated herein by reference in its entirety. Under this broadcast encryption scheme, whenever the subscriber set changes as new subscribers are added or expired subscribers are removed, a new cryptographic header needs to be created and to be distributed. The computation of the new cryptographic header is performed without reusing any previous computation result. Furthermore, the decryption of the encrypted content is performed also without reusing any previous computation result. As such, the computation for both cryptographic header generation and encrypted content decryption whenever the subscriber set is updated is intense, time consuming, and causes degradation to the overall content distribution performance.

Another shortcoming of the traditional broadcast encryption schemes is that the encryption schemes require the total number of content receiving clients in the distribution network to be fixed at the time of initial setup of the system and cannot be increased thereafter.

Therefore, there is a need for a new broadcast encryption scheme that can better utilize previous computation results during the cryptography header generation and encrypted content decryption when the subscriber set changes; and that the new broadcast encryption scheme is robust enough to handle an unlimited total content receiving client population.

SUMMARY

It is an objective of the presently claimed invention to provide a method and a system for content distribution with a broadcast encryption scheme with optimized cryptography header generation and decryption.

It is a further objective that the optimization is achieved by reusing the previous computation results in cryptography header generation and decryption when the subscription set changes. By using the differential ciphertext generation method, which is based on the previous ciphertext value, the amount of computation for generating the cryptography header is reduced. For the decryption process, portions of the reconstruction of the encryption secret is pre-computed and preserved using a wide window point addition method. Therefore, the subsequent encryption secret reconstruction can rely on the pre-computed results to speed up the computation time.

It is a further objective to provide a clustering solution in content distribution with a broadcast encryption scheme that can expand as desired to accommodate an unlimited number of content receiving clients.

BRIEF DESCRIPTION OF THE DRAWINGS

Embodiments of the invention are described in more detail hereinafter with reference to the drawings, in which:

FIG. 1 shows a block diagram schematically illustrating an exemplary content distribution system with broadcast encryption.

DETAILED DESCRIPTION

In the following description, systems and methods of broadcast encryption optimization by reusing previous cryptography header generation and decryption computation results, and scalability by using clustering are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

A content distribution network comprises at least a content distributor and one or more users or clients that receive the content. Broadcast encryption is primarily an ordered combination of processes comprising the Setup, Encryption, and Decryption processes.

According to some of the traditional broadcast encryption schemes, including the Boneh-Gentry-Waters broadcast encryption scheme, the primary output of the Setup process is a public key and private keys. The Setup process first selects a random generator $g \in G$ and a random $\alpha \in Z_p$. It computes the public parameters $g_i = g^{(\alpha^i)} \in G$ for $i=1, 2, \ldots, n, n+2, \ldots, 2n$ where n is the total number of content receiving clients in the content distribution network. Then it selects a random $\gamma \in Z_p$ and sets $v = g^\gamma \in G$. The public key is defined as:

$$PK = (g, g_1, \ldots, g_n, g_{n+2}, \ldots, g_{2n}, v) \in G^{2n+1}$$

The private keys are defined as:

$d_i = g_i^\gamma \in G$ for $i \in \{1, \ldots, n\}$ where i represents a certain content receiving client in the content distribution network. The private keys $d_i, \ldots, d_n$ are to be distributed to the content receiving clients. Each content receiving client is to receive and preserve one private key to be used in the subsequent Decryption process.

The Encryption process takes the public key PK generated and the subscriber set S to generate a encryption secret for encrypting the original content to be distributed, and a ciphertext, which is part of the cryptographic header, for distribution to the content receiving clients along with the encrypted content. The Encryption process first selects a random $t \in Z_p$. The encryption secret is defined as:

$$K = e(g_{n+1}, g)^t$$

The ciphertext is defined as:

$$Hdr = \left(g^t, \left(v \prod_{j \in S} g_{n+1-j}\right)^t\right) \in G^2$$
$$= (C_0, C_1)$$

The Decryption process is executed by each of the content receiving clients in the distribution network. In a television broadcasting network, a content receiving client typically is a receiver set top box. When the content receiving client i receives the cryptographic header, which includes the ciphertext, and the encrypted content, the Decryption process takes the client private key $d_i$ it received and preserved prior, and the ciphertext Hdr to re-construct the encryption secret K for decrypting the encrypted content. The encryption secret K can be computed by:

$$K = e(g_i, C_1) / e(d_i \Pi_{j \in S, j \neq i} g_{n+1-j+i}, C_0)$$

With the encryption secret K reconstructed from the private key $d_i$ and ciphertext Hdr, the encrypted content is decrypted using the encryption secret K. The result is a decrypted content that is equal to the original content. Because the Encryption process takes into account the subscriber set S when encrypting the original content, only a valid subscriber within the subscriber set S can successfully decrypt the encrypted content.

Referring to FIG. 1. In accordance to various embodiments of the presently claimed invention, the Encryption process is executed by an encryption server 110 residing at the content distributor. The encryption server 110 can be implemented by one or more computer servers. When the subscriber set changes, the ciphertext Hdr needs to be re-computed. In accordance to an embodiment of the presently claimed invention, the new ciphertext Hdr' is computed from the previous ciphertext Hdr by a differential ciphertext generation method, which steps are listed below:

1. When a ciphertext Hdr is first generated, a variant pHdr is preserved where $pHdr = (g, H) = (g, (v\Pi_{j \in S} g_{n+1-j}))$
2. When the subscriber set S changes, compute a new variant $pHdr' = (g, H')$ from pHdr:
   a. When a set of new content receiving clients $S^+$ are added to S, $H' = H\Pi_{j \in S^+} g_{n+1-j}$
   b. When a set of existing content receiving clients $S^-$ are removed from S, $H' = H / \Pi_{j \in S^-} g_{n+1-j}$
3. Compute Hdr' from pHdr':
   a. Generate a new random $t' \in Z_p$
   b. Compute $Hdr' = (g^{t'}, (H')^{t'})$ Still referring to FIG. 1. In accordance to various embodiments of the presently claimed invention, the Decryption process is executed by each of the content receiving client 120 in the distribution network. In a television broadcasting network, a content receiving client 120 typically is a receiver set top box comprising the electronic circuitries and processors for executing the Decryption process. The Decryption process comprises first reconstructing the encryption secret K for decrypting the received encrypted content according to:

$$K = e(g_i, C_1) / e(d_i \Pi_{j \in S, j \neq i} g_{n+1-j+i}, C_0)$$

This computation involves two bilinear pairings, one division, and m+1 point additions where m is the number of subscribers in the subscriber set S. In accordance to an embodiment of the presently claimed invention, the Decryption process can be sped up by using a wide window point addition method. The wide window point addition method speeds up the computation of $\Pi_{j \in S, j \neq i} g_{n+1-j+i}$ by pre-computing and preserving a number of computational results on the public parameters $\{g, g_1, \ldots, g_n, g_{n+2}, \ldots, g_{2n}\}$. The wide window point addition method comprises the following steps:

1. Select a wide window width k
2. Rename the public parameter group $\{g, g_1, \ldots, g_n, g_{n+2}, \ldots, g_{2n}\}$ as $\{r_1, \ldots, r_n, \ldots, r_{n+2}, \ldots, r_{2n}\}$
3. Divide the group $\{r_1, \ldots, r_n, r_{n+2}, \ldots, r_{2n}\}$ into $[2n/k]$ subgroups such that:

$$R_1 = \{r_1, \ldots, r_k\}$$
$$R_2 = \{r_{k+1}, \ldots, r_{2k}\}$$
$$\ldots \ldots$$
$$R_{[2n/k]} = \{r_{([2n/k]-1)k+1}, \ldots, r_{2n}\}$$

4. Compute and preserve $\{P_1, P_2, \ldots, P_{[2n/k]}\}$ where:

$$P_i = \{p = \Pi r_j, r_j \in Q | Q \subseteq R_i \text{ and } Q \neq \emptyset\}$$

For an exemplary demonstration of the wide window point addition method where a wide window width of two is used:

$$k = 2$$
$$R_1 = \{r_1, r_2\} \rightarrow P_1 = \{r_1, r_2, r_1 + r_2\}$$
$$\ldots \ldots$$

For another exemplary demonstration of the wide window point addition method where a wide window width of four is used:

$$k = 4$$
$$R_1 = \{r_1, r_2, r_3, r_4\} \rightarrow P_1 =$$
$$\{r_1, r_2, r_3, r_4, r_1 + r_2, r_1 + r_3, r_1 + r_4, r_2 + r_3, r_2 + r_4, r_3 + r_4,$$
$$r_1 + r_2 + r_3, r_1 + r_2 + r_4, r_1 + r_3 + r_4, r_2 + r_3 + r_4, r_1 + r_2 + r_3 + r_4\}$$
$$\ldots \ldots$$

To compute $\Pi_{j \in S, j \neq i} g_{n+1-j+i}$ for the reconstruction of the encryption secret K, first set $S' = \{g_{n+1-j+i} | j \in S, j \neq i\}$, then determine all the groups $U_i=\{R_i \cap S'\}$. And for all $U_i \neq \emptyset$, determine the product of all elements of $U_i$ in the pre-computed value $P_i$. Finally, $\Pi_{j \in S, j \neq i} g_{n+1-j+l} = \Pi_{i=1}^{[2n/k]} u_j$, $u_j \in U_i$, where $U_i \neq \emptyset$. Because $P_i$ can be pre-computed and preserved, the time for the subsequent reconstruction of the reconstruction of the encryption secret K is reduced, improving the performance of the Decryption process.

Still referring to FIG. 1. In addition to generating the public key PK and the private keys $d_i, \ldots, d_n$, the Setup process typically includes the operations of authenticating and authorizing the content receiving clients and determining their entitlement or subscription for accessing certain contents. The subscriber set S is determined in this manner. Because the number of private keys generated during this initial Setup process is fixed by the total content receiving client population n, this number n cannot be increased afterwards.

In accordance to various embodiments of the presently claimed invention, this limitation can be eliminated by using a clustering solution 130 where the content receiving clients are divided into different clusters. The division can be based on geographic locations of the content receiving clients. The clustering solution 130 comprises multiple instances of key servers for public and private keys generation, entitlement server for storing and providing the entitlement information of content receiving clients; and a clustering management server. The clustering management server contains information of each content receiving client, and the instance of key server and entitlement server that the content receiving client belongs to. By utilizing multiple instances of key server, the content distribution system has multiple sets of public keys and private keys. Each content receiving client receives the private key from its corresponding instance of key server.

With the clustering solution, the public parameters and subscriber set are generated for each instance respectively. The Encryption process is modified to generate the multiple sets of cryptography headers and encrypted contents corresponding to the instances, and distributed to the content receiving clients according to their instances that they belong to.

New instances of key servers and entitlement servers can be added to the content distribution system subsequently, thus expanding its capacity. In accordance to an embodiment of the presently claimed invention, the clustering management server provides a user management interface for configuring the mapping information between the content receiving clients and the instances of key servers and entitlement servers.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A content distribution method with broadcast encryption, comprising:
   executing once initially a setup process by a server presiding at the content distributor, the setup process produces a public key and one or more private keys;
   executing an encryption process by a server presiding at the content distributor, the encryption process comprising:
   computing once initially an initial ciphertext using the public key and a subscriber set;
      computing a new ciphertext when the subscriber set changes, the computation of the new ciphertext is based on a differential ciphertext generation method;
      generating an encryption secret;
      encrypting an original content into an encrypted content using the encryption secret;
   distributing the one or more private keys, the initial ciphertext or the new ciphertext, and the encrypted content to one or more content receiving clients in the distribution network; and
   executing a decryption process on the encrypted content by each of the content receiving clients in the distribution network, the decryption process is based on a wide window point addition method;
   wherein the subscriber set being a subset of all the content receiving clients in the distribution network decrypting the encrypted content into the original content using the private keys, and the initial ciphertext or the new ciphertext;
   wherein the subscriber set changes when one or more new subscribers are added to the subscriber set or one or more existing subscribers within the subscriber set are removed from the subscriber set;
   wherein the differential ciphertext generation method computes the new ciphertext by reusing previously preserved computational results of a previous ciphertext; and
   wherein the wide window point addition method reuses previously preserved computational results of group-divided point additions of public parameters in reconstructing the encryption secret.

2. The method of claim 1, further comprising:
   logically dividing the content receiving clients into a plurality of clusters;
   providing entitlement information of each of the content receiving clients from a plurality of instances of entitlement server, the instances of entitlement server correspond to the clusters;
   providing a plurality of public keys and a plurality of private keys from a plurality of instances of key server, the instances of key server correspond to the clusters;

distributing the private keys to the content receiving clients from the instance of key server that corresponds to the cluster which the content receiving clients belong to;

computing a plurality sets of initial ciphertext and new ciphertext, one set for each cluster and based on the public key and subscriber set of that cluster;

generating a plurality of encryption secrets, one for each cluster and using the corresponding ciphertext of that cluster;

encrypting an original content into a plurality of encrypted contents, one for each cluster and using the corresponding encryption secret of that cluster; and distributing the initial ciphertexts or the new ciphertexts, and the encrypted contents to the content receiving clients according to the clusters they belong to.

3. The method of claim 2, wherein the logical division of the content receiving clients into a plurality of clusters is based on geographical locations of the content receiving clients.

4. A content distribution method with broadcast encryption, comprising:

executing once initially a setup process by a server presiding at the content distributor, the setup process produces a public key and one or more private keys;

executing an encryption process by a server presiding at the content distributor, the encryption process comprising:
   computing once initially an initial ciphertext using the public key and a subscriber set;
   computing a new ciphertext when the subscriber set changes;
   generating an encryption secret;
   encrypting an original content into an encrypted content using the encryption secret;

distributing the one or more private keys, the initial cipher text or the new cipher text, and the encrypted content to the content receiving clients in the distribution network;

executing a decryption process on the encrypted content by each of the content receiving clients in the distribution network, the decryption process is based on a wide window point addition method;

wherein the subscriber set being a subset of all the content receiving clients in the distribution network decrypting the encrypted content into the original content using the private keys, and the initial ciphertext or the new ciphertext;

wherein the subscriber set changes when one or more new subscribers are added to the subscriber set or one or more existing subscribers within the subscriber set are removed from the subscriber set; and wherein the wide window point addition method reuses previously preserved computational results of group-divided point additions of public parameters in reconstructing the encryption secret.

5. The method of claim 4, wherein the wide window point addition method further provides a configurable wide window width for controlling group size of the group-divided point additions of public parameters.

6. The method of claim 4, further comprising:

logically dividing the content receiving clients into a plurality of clusters;

providing entitlement information of each of the content receiving clients from a plurality of instances of entitlement server, the instances of entitlement server correspond to the clusters;

providing a plurality of public keys and a plurality of private keys from a plurality of instances of key server, the instances of key server correspond to the clusters;

distributing the private keys to the content receiving clients from the instance of key server that corresponds to the cluster which the content receiving clients belong to;

computing a plurality sets of initial ciphertext and new ciphertext, one set for each cluster and based on the public key and subscriber set of that cluster;

generating a plurality of encryption secrets, one for each cluster and using the corresponding ciphertext of that cluster;

encrypting an original content into a plurality of encrypted contents, one for each cluster and using the corresponding encryption secret of that cluster; and distributing the initial ciphertexts or the new ciphertexts, and the encrypted contents to the content receiving clients according to the clusters they belong to.

7. The method of claim 6, wherein the logical division of the content receiving clients into a plurality of clusters is based on geographical locations of the content receiving clients.

* * * * *